US008745508B2

(12) United States Patent
Olumoko et al.

(10) Patent No.: US 8,745,508 B2
(45) Date of Patent: Jun. 3, 2014

(54) SYSTEMS AND METHODS FOR USER POLLING

(75) Inventors: Olufemi Olumoko, Laurel, MD (US);
Vinod K. Menon, Elkridge, MD (US);
Omoniyi Segun, Odenton, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 630 days.

(21) Appl. No.: 12/783,176

(22) Filed: May 19, 2010

(65) Prior Publication Data

US 2011/0289431 A1    Nov. 24, 2011

(51) Int. Cl.
*G06F 3/00* (2006.01)

(52) U.S. Cl.
USPC ........... 715/753; 715/733; 715/744; 715/748; 715/751; 715/860

(58) Field of Classification Search
None
See application file for complete search history.

(56) References Cited

U.S. PATENT DOCUMENTS

| 7,171,448 | B1* | 1/2007 | Danielsen et al. | 709/205 |
| 2003/0200543 | A1* | 10/2003 | Burns | 725/16 |
| 2007/0100699 | A1* | 5/2007 | Ajizadeh | 705/14 |
| 2007/0168558 | A1* | 7/2007 | Taylor et al. | 709/246 |
| 2008/0229216 | A1* | 9/2008 | Bagley et al. | 715/753 |
| 2009/0037248 | A1* | 2/2009 | Sholtis et al. | 705/10 |
| 2011/0029895 | A1* | 2/2011 | Ternouth | 715/753 |
| 2011/0047482 | A1* | 2/2011 | Arthurs et al. | 715/751 |
| 2012/0159350 | A1* | 6/2012 | Gaume | 715/753 |

* cited by examiner

Primary Examiner — Anil N. Kumar

(57) ABSTRACT

Exemplary systems and methods for user polling are disclosed. An exemplary method includes a service provider subsystem receiving, from a poll provider subsystem, data representative of a poll comprising at least one poll question, transmitting the poll in a first data format to a plurality of translators for translation and distribution to a plurality of access devices associated with a plurality of users and with a plurality of distinct, heterogeneous media platforms, receiving from the plurality of translators, data representative of one or more responses to the at least one poll question provided by one or more of the plurality of access devices, aggregating the data representative of the one or more responses, generating poll results based on the one or more responses, and transmitting data representative of the poll results to the poll provider subsystem and/or the plurality of access devices. Corresponding methods and systems are also disclosed.

16 Claims, 15 Drawing Sheets

POLL MANAGER

HOME > CREATE NEW POLL  Account  Log Out

Poll Title: Presidential Debate Winner — 502-1

Poll Question(s): Which presidential candidate won the debate? — 502-2

Poll Response Choices — 502-3
A. Allison Taylor
B. Noah Daniels
C. Neither

+ Add Poll Question

Poll Distribution Criteria
Age: 25 - 34
State: California — 502-4

+ Add Distribution Criteria

Media Platform — 502-5
Television
Mobile Phones
Internet

+ Add Polling Platform

Poll Schedule
9/25 — 502-6
9:00pm-10:00pm — 502-7

Create — 504
Cancel — 506

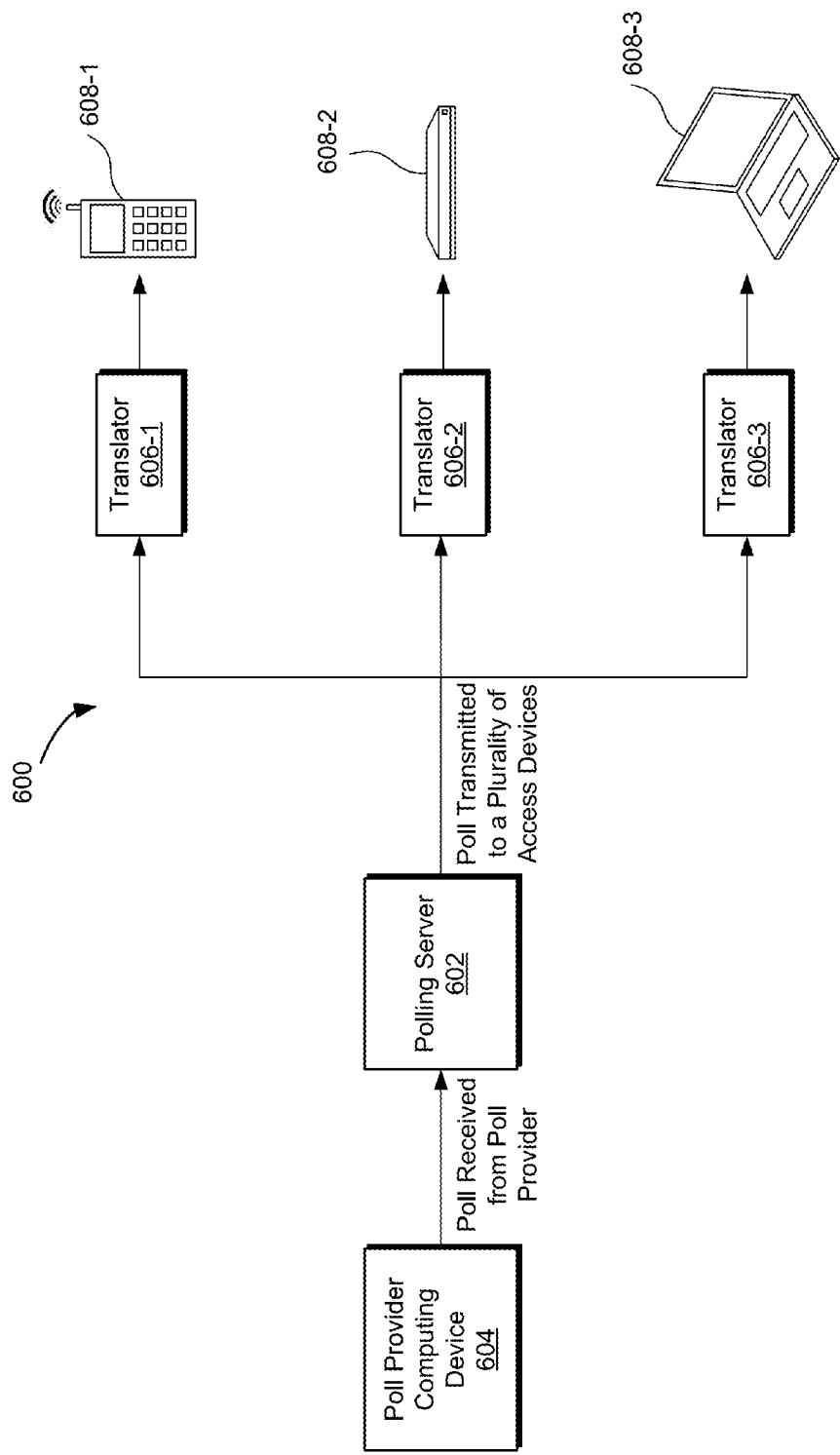

HOME > ACTIVE POLLS

POLL MANAGER

Account   Log Out

Poll Title
Poll Question(s)
Response Choices

1004 — Poll Results

| | Television Responses | Mobile Device Responses | Internet Responses | Totals |
|---|---|---|---|---|
| 1002 | | | | |
| — Presidential Debate Winner | | | | |
| Who won the presidential debate? | | | | |
| A. Allison Taylor | 47% (64,390) | 49% (46,550) | 50% (106,000) | 49% (216,940) |
| B. Noah Daniels | 43% (58,910) | 44% (41,800) | 47% (99,640) | 45% (200,350) |
| C. Neither | 10% (13,700) | 7% (6,650) | 3% (6,360) | 6% (26,710) |

| | Republicans | Democrats | Independents | Totals |
|---|---|---|---|---|
| A. Allison Taylor | 50% (106,000) | 47% (64,390) | 49% (46,550) | 49% (216,940) |
| B. Noah Daniels | 44% (93,280) | 46% (63,020) | 46% (44,050) | 45% (200,350) |
| C. Neither | 6% (12,720) | 7% (9,590) | 5% (4,400) | 6% (26,710) |

SYSTEMS AND METHODS FOR USER POLLING

BACKGROUND INFORMATION

Polling has enjoyed widespread use over the years. It provides a way of acquiring individual opinions and can provide invaluable data on a variety of topics including political opinions, pop culture and fashion trends, scientific surveys, product design, etc. As media content distribution and processing technologies have advanced, increased numbers and types of media outlets have provided a variety of platforms that may be used by poll providers to distribute opinion polls to potential poll participants.

However, conventional polling suffers from a number of drawbacks. For example, conventional polling requires individuals to go to a specific location where a poll is being conducted, be it physical (e.g., a polling booth) or virtual (e.g., a webpage). This requirement sometimes poses some inconvenience for a user and hence can often reduce the number of poll responses acquired in the absence of any additional incentives or motivation for potential poll participants. In addition, disadvantages associated with conventional polling often delay the delivery of polling results to the poll provider or to the public. Accordingly, a number of disadvantages exist with respect to the delivery of, participation in, and reporting of results of conventional polls.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers may designate identical or similar elements.

FIG. 5 illustrates an exemplary graphical user interface ("GUI") through which a poll provider may create a poll according to principles described herein.

FIG. 6 illustrates the flow of a poll to a plurality of access devices over a plurality of distinct, heterogeneous media platforms according to principles described herein.

FIG. 10 illustrates an exemplary GUI through which poll results may be displayed to a poll provider according to principles described herein.

DETAILED DESCRIPTION OF PREFERRED EMBODIMENTS

Exemplary systems and methods for user polling are disclosed herein. As described further below, one or more of the exemplary systems and/or methods disclosed herein may enable a poll provider to efficiently create and provide a poll for delivery to one or more users and to receive responses to the poll without the limitations inherent in conventional polling. For example, the exemplary systems and/or methods disclosed herein may allow the poll provider to provide the poll to a service provider, which may deliver the poll to a widespread group of potential poll participants across multiple media platforms. In addition, certain systems and/or methods disclosed herein may provide an interactive polling service that allows for effective delivery of and participation in polls in a timely manner (e.g., in real time, near real time, or on-demand), wherever the poll participant may be.

As an example, a service provider subsystem may be configured to receive data representative of a poll comprising at least one poll question from a poll provider subsystem, transmit data representative of the poll to a plurality of translators for translation and distribution to a plurality of access devices associated with a plurality of users and with a plurality of distinct, heterogeneous media platforms, receive data representative of one or more responses to the at least one poll question provided by one or more of the plurality of access devices, aggregate the one or more responses, generate poll results based on the one or more responses, and transmit data representative of the poll results to the poll provider subsystem and/or the plurality of access devices. In this or a similar manner, a user base associated with one or more media platforms may be leveraged to obtain user input, feedback, and/or opinions.

Components and functions of exemplary user polling systems and methods will now be described with reference to the drawings.

Figure 1:
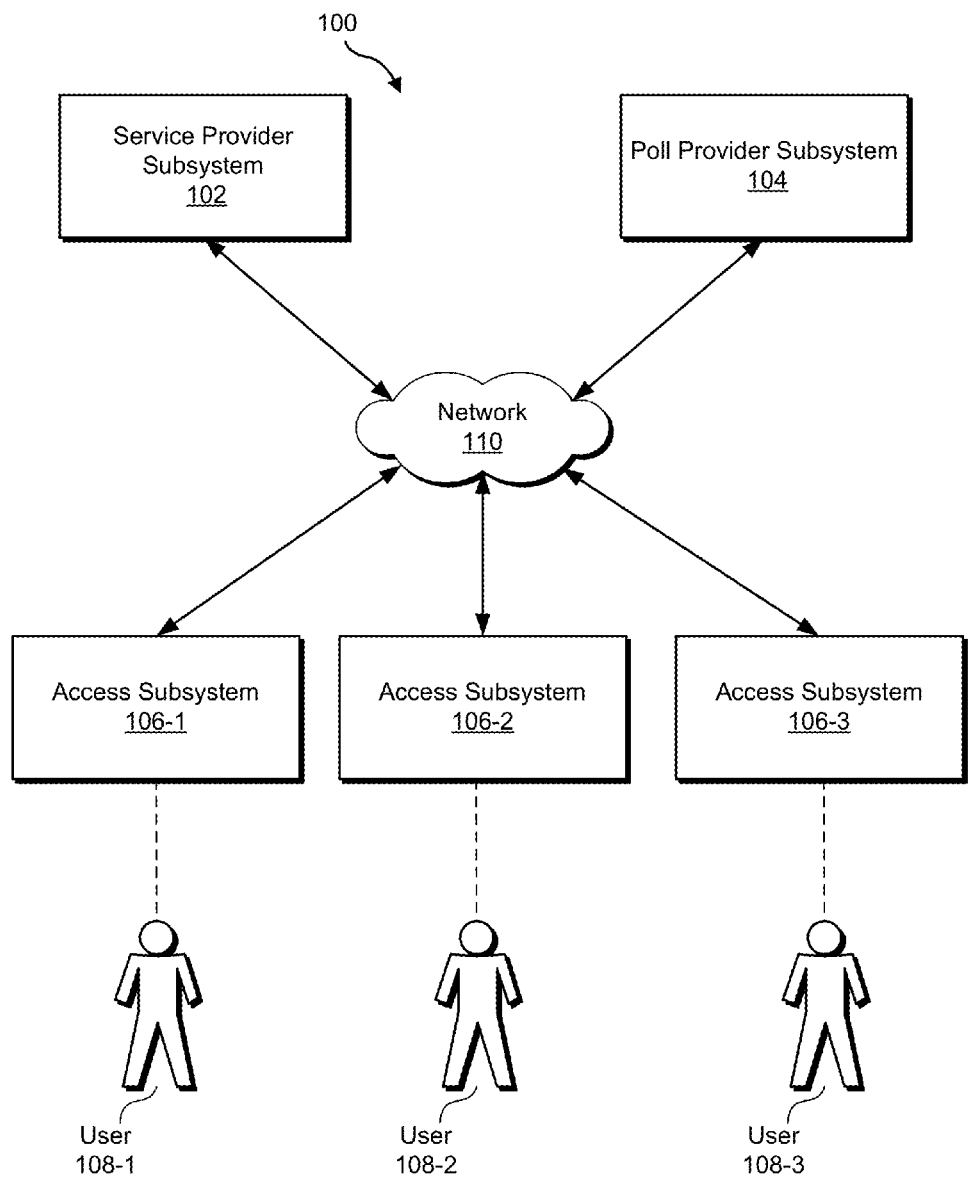
FIG. 1 illustrates an exemplary user polling system according to principles described herein.

FIG. 1 illustrates an exemplary user polling system 100 (or simply "system 100") configured to perform one or more of the processes described herein. As shown in FIG. 1, system 100 may include a service provider subsystem 102 that is communicatively coupled to a poll provider subsystem 104 and a plurality of access subsystems 106-1, 106-2, and 106-3 (collectively referred to herein as "access subsystems 106") associated with a plurality of users 108-1, 108-2, and 108-3 (collectively referred to herein as "users 108"). While FIG. 1 shows three access subsystems 106, it will be recognized that system 100 may include any number of access subsystems 106 as may serve a particular implementation. In particular, service provider subsystem 102 may be communicatively coupled to poll provider subsystem 104 and access subsystems 106 through a network 110.

In some examples, service provider subsystem 102 and/or poll provider system 104 may be configured to generate or otherwise provide a poll for distribution to users 108. In certain embodiments, service provider subsystem 102 may be configured to receive data representative of the poll from poll provider subsystem 104 for distribution to one or more access subsystems 106 associated with users 108. To this end, service provider subsystem 102 may provide an interface through which a poll provider operating poll provider subsystem 104 may create and/or provide data representative of the poll to service provider subsystem 102 and receive poll results from service provider subsystem 102, as described in more detail herein.

As used herein, the term "poll" may refer to any inquiry into public opinion. For example, a poll may be configured to elicit user responses regarding any subject (e.g., sports, politics, economics, entertainment, etc.). A poll provider may configure the poll as desired and utilize to the poll to obtain valuable information regarding public opinion, from which the poll provider and/or the public may benefit. The poll may include at least one poll question configured elicit a response by users 108. The poll question may be associated with one or more response choices from which users 108 may choose to respond to the poll question. Data representative of the poll may include any text, audio, video, image(s), photograph(s), document(s), application file(s), or any segment, component, or combination of these or any other data representative of a poll.

In some examples, the poll may have a multiple choice format, wherein each poll question is associated with multiple response choices from which a user may select a response to the poll question. For example, a poll question may be associated with two possible response choices from which a user may select a response to the poll question (e.g., the poll question may be a "true or false" question with possible response choices of "true" and "false"). In additional or alternative examples, a poll question may be associated with more or less response choices. In some examples, a poll may include a plurality of poll questions, whether focused on a single subject or spanning multiple related or unrelated subjects, and one or more response choices associated with each poll question.

In some examples, the poll may be transmitted and/or presented in conjunction with a media content instance (e.g., an advertisement, a television program, a political debate program). Additionally or alternatively, the poll may be configured to elicit user feedback regarding the media content instance (e.g., a user's rating of a television program, a user's likelihood to purchase a particular product advertised in an advertisement, a user's likelihood to vote for a particular political candidate, etc.).

The term "media content instance" as used herein refers to any data record or object (e.g., an electronic file) storing, including, or otherwise associated with media content, which may include data representative of a song, audio clip, movie, video, image, photograph, television program (e.g., a broadcast, multicast, or narrowcast television program), or any segment, component, or combination of these or other forms of content that may be experienced or otherwise accessed by a user. A media content instance may have any data format as may serve a particular application. For example, a media content instance may include an audio file having an MP3, WAV, AIFF, AU, or other suitable format, a video file having an MPEG, MPEG-2, MPEG-4, MOV, DMF, DivX, or other suitable format, an image file having a JPEG, BMP, TIFF, RAW, PNG, GIF or other suitable format, and/or a data file having any other suitable format.

In certain examples, service provider subsystem 102 may deliver the poll directly to access subsystems 106 through network 110. Alternatively, service provider subsystem 102 may be configured to deliver the poll to one or more translators for translation and distribution to access subsystems 106. For example, as will be explained in more detail below, service provider subsystem 102 may be configured to transmit the poll in a first data format for translation by one or more translators into one or more formats native to access subsystems 106. Once translated, the poll may be distributed to access subsystems 106 to be displayed or otherwise presented to users 108.

Service provider subsystem 102 may be configured to receive, from access subsystems 106, data representative of one or more responses to the poll. For example, users 108 may utilize access subsystems 106 to submit one or more responses to a poll question included in the poll. In certain examples, the one or more responses may be translated by one or more translators from data formats native to access subsystems 106 to the first data format (e.g., an extensible markup language such as XML) used by service provider subsystem 102.

After receiving the one or more responses, service provider subsystem 102 may be configured to aggregate the one or more responses and generate poll results based on the responses, as will be explained in more detail below. Once poll results are generated, service provider subsystem 102 may be configured to transmit the generated poll results to poll provider subsystem 104 and/or access subsystems 106.

Poll provider subsystem 104 may be used by a poll provider to access an interface provided by service provider subsystem 102. Through the interface, the poll provider may create, provide, and/or otherwise manage a poll. In some examples, poll provider subsystem 104 may include a computing device associated with the poll provider and configured to provide the poll provider with access to service provider subsystem 102, such as through a web-based interface. In certain embodiments, the computing device may include an agent or application associated with service provider subsystem 102 and configured to perform one or more of the poll provider subsystem 104 and/or service provider subsystem 102 processes described herein.

Access subsystems 106 may each be configured to receive, display, and/or otherwise access a poll, such as a poll delivered by service provider subsystem 102. For example, access subsystems 106 may be configured to display, play, or otherwise present the poll to users 108. An exemplary access subsystem 106 may include, but is not limited to, an access device, such as a set-top-box device, a digital video recorder ("DVR") device, a media content processing device, a communications device, a mobile device (e.g., a mobile phone device), a handheld device, a personal computer, a phone device, a personal-digital assistant device, a gaming device, a television device, and/or any device configured to perform one or more of the access subsystem processes and/or operations described herein.

As will be described in more detail below, access subsystems 106 may be associated with a plurality of distinct, heterogeneous media platforms. For example, access subsystem 106-1 may be associated with a first distinct, heterogeneous media platform, access subsystem 106-2 may be associated with a second distinct, heterogeneous media platform, and access subsystem 106-3 may be associated with a third distinct, heterogeneous media platform. Accordingly, a poll provider may utilize poll provider subsystem 104 and/or service provider subsystem 102 to generate and deliver a poll to a plurality of users 108 across a plurality of distinct, heterogeneous media platforms.

Components of system 100 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

As mentioned, components of system 100 may be configured to communicate with each other over network 110. Network 110 may include one or more networks or types of networks capable of carrying communications and/or data signals between the components of system 100. For example, network 110 may include, but are not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network (e.g., a Verizon® FIOS® network), the Internet, an intranet, local area network, any other suitable network, and/or any combination or sub-combination of these networks.

While FIG. 1 shows components of system 100 communicatively coupled via network 110, it will be recognized that the components of system 100 may be configured to communicate one with another in any other suitable manner (e.g., via a direct connection) in other embodiments.

Figure 2:
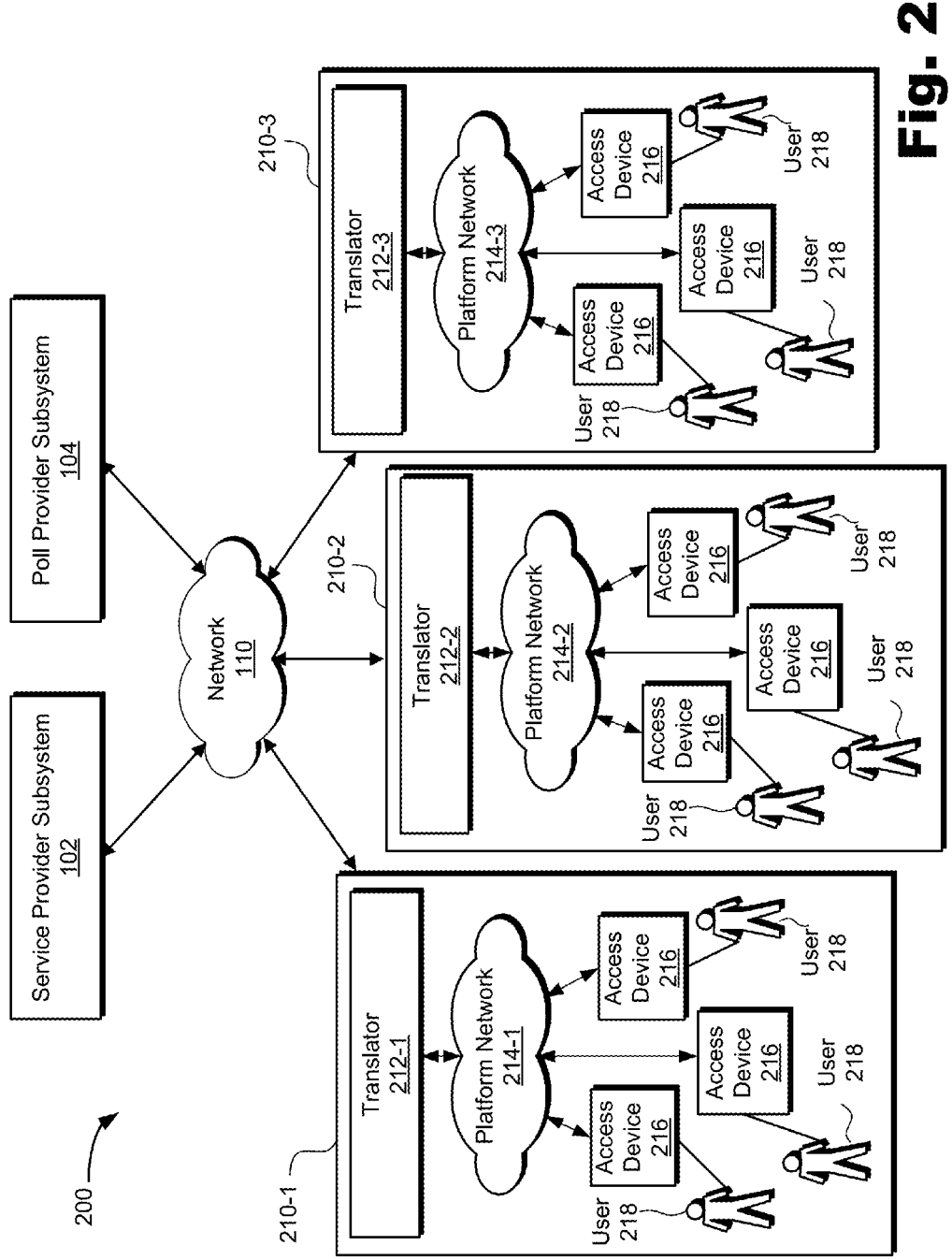
FIG. 2 illustrates exemplary implementation of the exemplary user polling system of FIG. 1 according to principles described herein.

FIG. 2 illustrates an exemplary implementation 200 of system 100 according to principles described herein. As shown in FIG. 2, implementation 200 may include service provider subsystem 102 communicatively coupled to poll provider subsystem 104 and a plurality of distinct, heterogeneous media platforms 210-1, 210-2, and 210-3 (collectively referred to herein as "media platforms 210") via network 110. Each of the media platforms 210 may be associated with a translator (e.g., translators 212-1, 212-2, and 212-3 (collectively referred to herein as "translators 212")), a platform network (e.g., platform networks 214-1, 214-2, and 214-3 (collectively referred to herein as "platform networks 214")), and a plurality of access devices 216 associated with a plurality of users 218. For example, service provider subsystem 102 may be communicatively coupled with translators 212, which may in turn be communicatively coupled with access devices 216 through platform networks 214.

In some examples, service provider subsystem 102 may be configured to transmit a poll to translators 212 for translation and distribution to access devices 216. For example, service provider subsystem 102 may be configured to transmit a poll in a first data format to translators 212, which may be configured to translate the poll from the first data format to other data formats native to media platforms 210 and/or access devices 216. The translated poll may then be distributed to access devices 216 for presentation to users 218. To this end, service provider subsystem 102 may be configured to communicate with translators 212 (e.g., one or more server devices or other computing devices associated with media platforms 210) to leverage media platforms 210 to facilitate delivery of a poll to access devices 216 across media platforms 210.

Users 218 may utilize access devices 216 to submit one or more responses to the poll. For example, users 218 may utilize access devices 216 to respond to one or more poll questions included within the poll for submission to service provider subsystem 102 and/or poll provider subsystem 104. In certain embodiments, translators 212 may be configured to translate responses submitted using access devices 216 from data formats native to media platforms 210 and/or access devices 206 to the first data format used by service provider subsystem 102.

Media platforms 210 may operate distinctly and/or independently of one another. In particular, each media platform 210 may be associated with a particular translator 212, a particular platform network 214, and/or a number of particular access devices 216 associated with a number of users 218, independent of any other media platform 210. Accordingly, each of the translators 212 may perform one or more media platform processes and/or operations independently of the media platform processes and/or operations performed by the other translators 212. For instance, each of the translators 212 may be configured to translate and/or distribute a poll and/or poll responses independently of the other translators 212. In certain embodiments, the independence of the translators 212 may also include physical and/or logical separation of the translators 212.

Media platforms 210, and the components thereof, may be heterogeneous. For example, media platforms 210 may be heterogeneous in one or more of the following ways: each media platform 210 may be associated with a distinct type of media, each media platform 210 may associated with a distinct type of access device 216, and/or each media platform 210 may be associated with a distinct media distribution platform (e.g., television, mobile phone, Internet service platforms). Media platforms 210 may be heterogeneous in any of a number of additional or alternative ways. The examples of media platforms 210 described herein are illustrative only and not limiting in any sense. Other combinations of independent and/or heterogeneous media platforms 210 may be employed to deliver polls to users 218 in other embodiments. Such combinations may include any combinations and/or sub-combinations of the exemplary media platforms 210 described herein.

Each translator 212 may include one or more computing devices configured to perform one or more of the processes or steps described herein. In some examples, each translator 212 may include a server associated with its respective media platform 210 and configured to communicate with its respective access devices 216. In certain embodiments, a translator 212 and/or an access device 216 may include an agent or application of the service provider subsystem 102 running on the translator 212 and/or access device 216 and configured to perform one or more of the processes and/or process steps described herein.

While an exemplary implementation 200 of system 100 is shown in FIG. 2, the exemplary components illustrated in FIG. 2 are not intended to be limiting. Other hardware environments and/or configurations may be used in other implementations.

Figure 3:
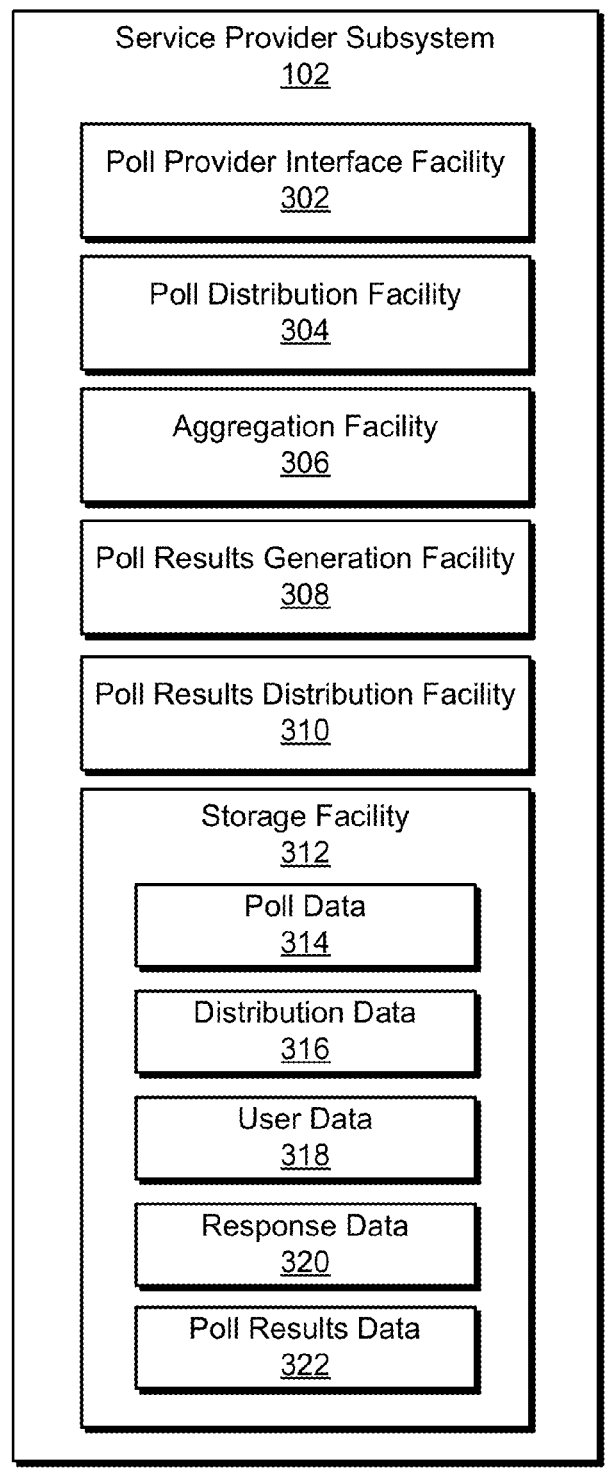
FIG. 3 illustrates an exemplary service provider subsystem according to principles described herein.

FIG. 3 illustrates exemplary components of service provider subsystem 102. As shown in FIG. 3, service provider subsystem 102 may include a poll provider interface facility 302, a poll distribution facility 304, an aggregation facility 306, a poll results generation facility 308, a poll results distribution facility 310, and a storage facility 312 communicatively coupled to one another. The components of service provider subsystem 102 may communicate with one another, including sending data to and receiving data from one another, using any suitable communication technologies.

Poll provider interface facility 302 may be configured to provide an interface supporting communications with poll provider subsystem 104 and/or a poll provider operating poll provider subsystem 104. Accordingly, poll provider interface facility 302 may receive data associated with a poll from poll provider subsystem 104 and may provide data associated with the poll to poll provider subsystem 104. In certain embodiments, poll provider interface facility 302 may provide an interface including a portal and/or a graphical user interface ("GUI") accessible by poll provider subsystem 104. The portal and/or GUI may provide one or more tools for use by a poll provider. Such tools may include tools configured to facilitate creation of a poll, submission of the poll for distribution, definition of poll distribution criteria, and/or tracking of the status of a poll (e.g., tracking poll results).

Poll distribution facility 304 may be configured to deliver data representative of a poll to one or more access devices (e.g., access subsystems 106 or access devices 216) associated with one or more users (e.g., users 108 or users 218). In certain embodiments, poll distribution facility 304 may be configured to identify a group of access devices associated with a plurality of users based on one or more distribution criteria and distribute the poll to the identified group. The distribution criteria may be received from a poll provider associated with poll provider subsystem 104 and may relate to any information associated with the users and/or associated access devices targeted by the poll. For example, a poll provider associated with poll provider subsystem 104 may desire to target users of a particular age (e.g., users over the age of 50), of a particular geographic location (e.g., users living in the Pacific Time Zone), of a particular political affiliation (e.g., Democrats), of a particular socio-economic status (e.g., middle class), of a particular media platform (e.g., mobile phone device users), of a particular education level (e.g., high school education or greater), of a particular race (e.g., Hispanic), and/or of any other particular distribution group. To achieve the desired result, the poll provider may submit corresponding distribution criteria with the poll to be distributed, and poll distribution facility 304 may distribute the poll to users satisfying the one or more distribution criteria and abstain from distributing the poll to users who do not satisfy the one or more distribution criteria.

Aggregation facility 306 may be configured to receive and/or aggregate responses to a poll by one or more users. For example, aggregation facility 306 may be configured to receive responses to poll questions submitted by users 108 using access subsystems 106. Aggregation facility 306 may aggregate the received responses to facilitate generation of poll results associated with the poll. Aggregation facility 306 may receive the poll responses from access subsystems 108 and/or aggregate the poll responses in any suitable manner as may serve a particular implementation.

Poll results generation facility 308 may be configured to generate poll results based on responses received from users. For example, poll results generation facility 308 may tally poll responses, calculate percentages of poll responses, and/or perform any other suitable calculation associated with the poll responses. In some examples, poll results generation facility 308 may be configured to generate poll results in real time as responses are received from users. In some examples, poll results generation facility 308 may be further configured to categorize poll results. The poll results may be categorized based on any suitable categories, such as age, geographic location, ethnicity, political affiliation, race, socio-economic status, social network affiliation, media platform, and/or education associated with users who provided the poll responses. In certain examples, poll results may be broken down to include total poll results as well as categorized poll results. As a result, a poll provider may be able to obtain information regarding both general user opinion regarding a particular poll as well as category-specific user opinion regarding the particular poll.

Poll results distribution facility 310 may be configured to distribute poll results generated by poll results generation facility 308. For example, poll results distribution facility 310 may receive poll results from poll results generation facility 308 and distribute the poll results to a poll provider (e.g., to a poll provider associated with poll provider subsystem 104) and/or to users (e.g., to access subsystems 106 associated with users 108). Poll results distribution facility 310 may be configured to distribute the poll results in any suitable manner. In some examples, poll results distribution facility 310 may be configured to distribute poll results in real time. In this manner, poll providers and users may be provided with instant poll results associated with a particular poll at any particular time.

In certain examples, poll results distribution facility 310 may be configured to make poll results accessible to persons affiliated with users participating in the poll through one or more social networks. For example, after a user submits responses to a poll, poll results distribution facility 310 may make the user's poll responses available to one or more persons affiliated with the user through a social networking website (e.g., to one or more Facebook friends of the user).

Storage facility 312 may be configured to maintain poll data 314, distribution data 316, user data 318, response data 320, and/or poll results data 322. Poll data 314 may include data representative of one or more polls including data representative of poll questions, corresponding response choices, and any other information associated with polls. Distribution data 316 may include data representative of distribution criteria for the polls. User data 318 may include data representative of users, such as data related to user's access devices, data related to personal user information (e.g., data related to the user's age, geographic location, ethnicity, political affiliation, race, socio-economic status, social network affiliation, education, etc.), data related to past polls (e.g., responses submitted by users in response to previous polls), user preferences, media platforms with which users are associated, and/or any other user data (e.g., user billing information). Response data 320 may include data representative of responses submitted by users in response to polls. Poll results data 322 may include data representative of poll results generated by poll results generation facility 310. Storage facility 312 may be configured to maintain additional or alternative data as may serve a particular application.

Figure 4:
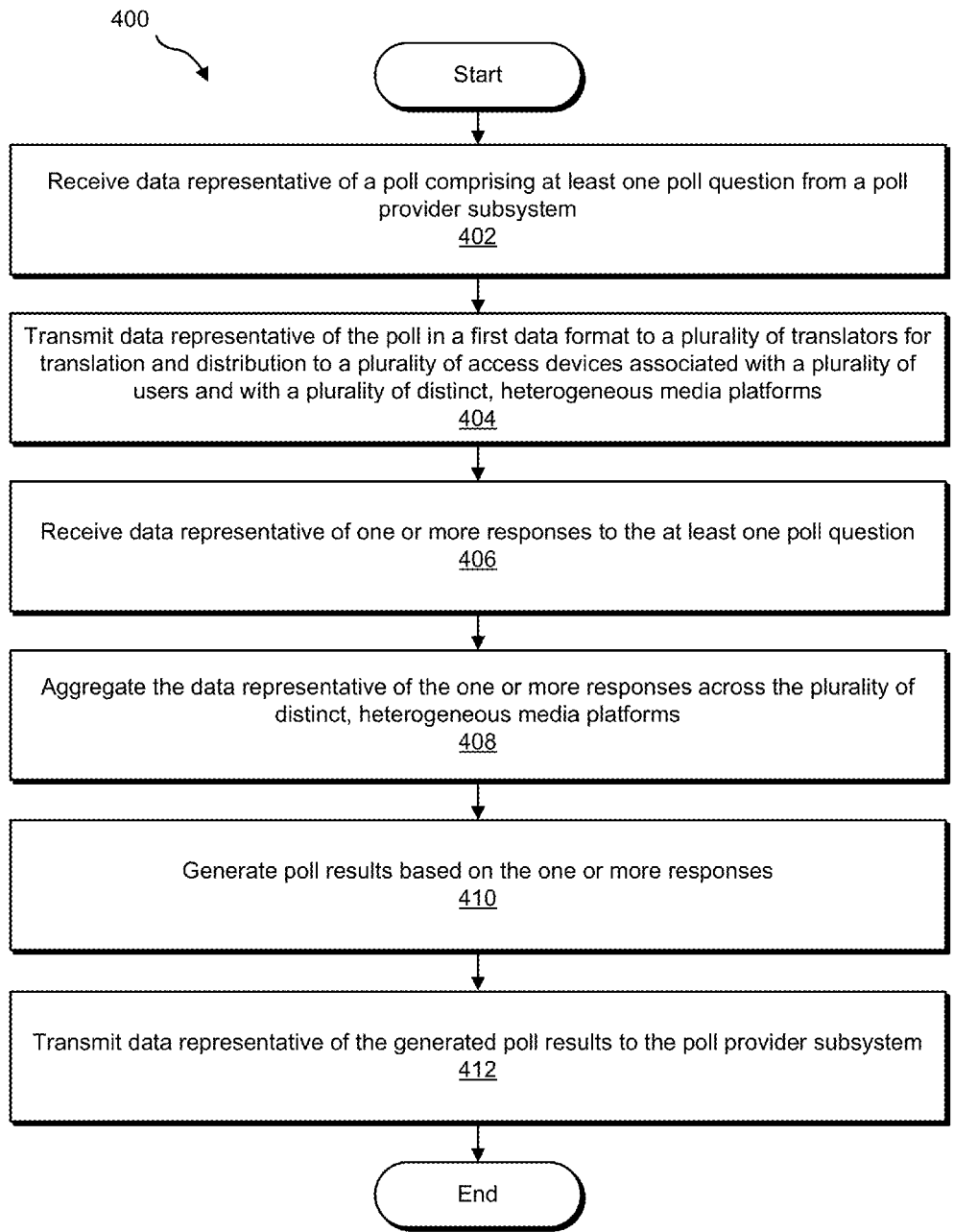
FIG. 4 illustrates an exemplary user polling method according to principles described herein.

FIG. 4 illustrates an exemplary user polling method 400. While FIG. 4 illustrates exemplary steps according to one embodiment, other embodiments may omit, add to, reorder, and/or modify any of the steps shown in FIG. 4. One or more of the steps shown in FIG. 4 may be performed by any component or combination of components of system 100.

In step 402, data representative of a poll may be received. The poll may include at least one poll question and one or more response choices corresponding to the at least one poll question. The data representative of the poll may be received by poll provider interface facility 302 in any suitable manner. For example, the data representative of the poll may be received by way of a GUI provided by the poll provider interface facility 302.

FIG. 5 illustrates an exemplary GUI 500 that may be provided by poll provider interface facility 302 and that may be configured to facilitate generation by a poll provider of a user poll including at least one poll question. GUI 500 may be presented to the poll provider in any suitable manner as may serve a particular implementation. For example, GUI 500 may be presented to the user in a web browser as part of a web-based application configured to allow the poll provider to generate the poll using a computing device, and/or in any other suitable manner.

As shown in FIG. 5, a plurality of editable fields 502-1 through 502-7 (referred to collectively herein as "fields 502"), each associated with one or more aspects of a poll, may be displayed within GUI 500. GUI 500 shows seven fields 502 for illustrative purposes only. It will be recognized that any number of fields 502 and any number of associated poll parameters may be displayed within GUI 500 as may serve a particular implementation. GUI 500 may also include selectable options (e.g., options 504 and 506) configured to allow a poll provider to create the poll or cancel the poll.

The poll provider may enter a title or other description of the poll in field 502-1. The poll provider may enter one or more poll questions in field 502-2 and one or more corresponding poll response choices for each poll question in field 502-3. The poll provider may enter one or more poll distribution criteria in field 502-4. For example, the distribution criteria may specify one or more distribution categories (e.g., an age category or a geographic location category) and one or more criteria within each category. The poll provider may select one or more media platforms through which to transmit the poll in field 502-5. The poll provider may specify a date and time to conduct the poll in fields 502-6 and 502-7, respectively. Accordingly, the poll may be distributed at the specified date and time to only users that satisfy the selected distribution criteria and are associated with the selected media platforms.

To illustrate, a poll provider may access and utilize GUI 500 to create and initiate a user poll regarding a recent presidential debate. Using GUI 500, the poll provider may submit a poll question asking users "Which presidential candidate won the debate?" with the available response choices being "A. Allison Taylor," "B. Noah Daniels," and "C. Neither." To narrow distribution of the poll to a particular group of users, the poll provider may utilize GUI 500 to enter distribution criteria requiring that the users be between the ages of 25 and 34 and that the users be from the state of California. The poll provider may utilize GUI 500 to select a television service platform, a mobile phone service platform, and an internet service platform through which the poll will be distributed. As further illustrated by GUI 500, the poll provider may also choose to conduct the poll on September 25 between 9:00 pm and 10:00 pm. As will be described in more detail below, the data inputted into the GUI 500 by the poll provider may be utilized by poll distribution facility 304, aggregation facility 306, poll results generation facility 308, and/or poll results distribution facility 310 to execute the user poll. Once the poll is generated, data representative of the poll may be stored and maintained as poll data 314 in storage facility 312.

GUI 500 is provided for illustrative purposes only. The poll may be received from poll provider subsystem 104 in any other suitable manner as may serve a particular implementation.

Returning to FIG. 4, in step 404, data representative of the poll may be transmitted to a plurality of access devices associated with a plurality of users. For example, poll distribution facility 304 may initiate delivery of the poll to one or more access devices associated with access subsystems 106 over network 110. The data representative of the poll may be delivered to the plurality of access devices in any suitable manner, including in any of the ways described herein. As an example, the poll may be transmitted to one or more translators (e.g., translators 212) for translation and distribution to the plurality of access devices. For instance, the poll may be transmitted to the one or more translators in a first data format, and the one or more translators may be configured to translate the data from the first data format to one or more data formats native to the plurality of access devices for distribution to the plurality of access devices.

Additionally or alternatively, the plurality of access devices may be associated with a plurality of distinct, heterogeneous media platforms, as explained in more detail herein. For example, one or more access devices of the plurality of access devices may be associated with a first media platform (e.g., a mobile phone service platform), one or more other access devices of the plurality of access devices may be associated with a second media platform (e.g., a television service platform), and one or more other access devices of the plurality of access devices may be associated with a third media platform (e.g., an Internet service platform). In some examples, each of the distinct, heterogeneous media platforms may be associated with a translator configured to translate the poll from the first data format into a data format native to the distinct, heterogeneous media platform.

For example, FIG. 6 illustrates an implementation 600 of system 100. As shown in FIG. 6, a polling server 602 may be configured to receive a poll from a poll provider computing device 604. Polling server 602 may be configured to transmit the poll received from poll provider computing device 604 to a plurality of translators 606-1, 606-2, and 606-3 (collectively referred to herein as "translators 606") for translation and distribution to a plurality of access devices 608-1, 608-2, and 608-3 (collectively referred to herein as "access devices 608"), respectively.

Each access device 608 may be associated with a different media platform. To illustrate, access device 608-1 may be a mobile phone device associated with a mobile phone service platform, access device 608-2 may be a set-top-box device associated with a television service platform, and access device 608-3 may be a personal computer associated with an Internet service platform. Additionally or alternatively, translator 606-1 may be configured to translate the poll from a data format native to polling server 602 to a data format native to the mobile phone device and/or the mobile phone service platform, translator 606-2 may be configured to translate the poll from a data format native to polling server 602 to a data format native to the set-top-box device and/or the television service platform, and translator 606-3 may be configured to translate the poll from a data format native to polling server 602 to a data format native to the personal computer and/or the Internet service platform.

Access devices 608 may be configured to display or otherwise present the poll to users associated with access devices 608. Accordingly, a poll provider associated with poll provider computing device 604 may leverage polling server 602 to transmit a poll to a plurality of users across a plurality of distinct, heterogeneous media platforms.

Figure 7:
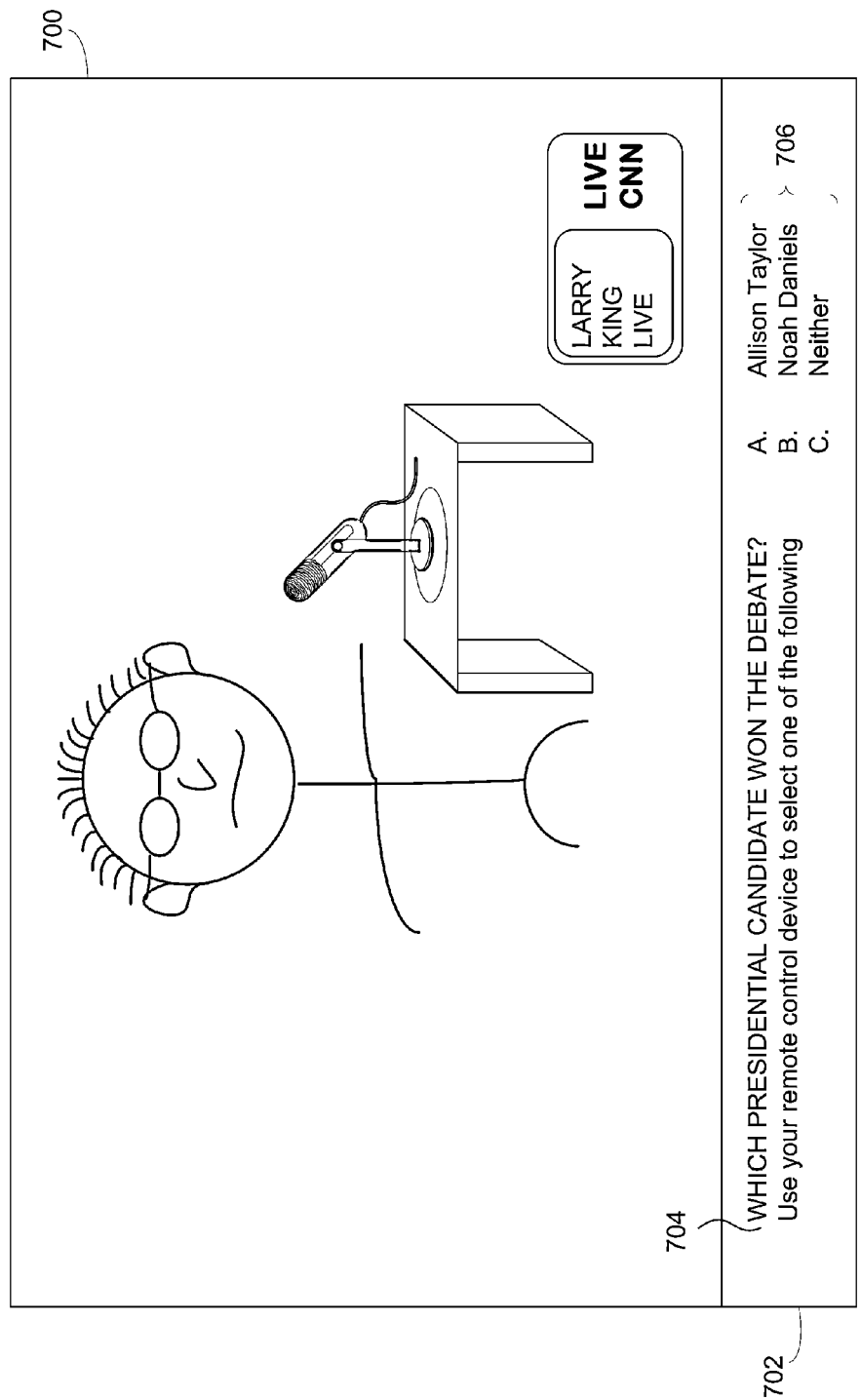
FIG. 7 illustrates an exemplary display of a poll question in conjunction with display of a media content instance according to principles described herein.

In some examples, the poll may be transmitted and/or presented in conjunction with a media content instance. FIG. 7 illustrates an exemplary display of a poll 702 in conjunction with the display of a media content instance 700 according to principles described herein. Media content instance 700 may include any suitable media content instance as may serve a particular implementation. To illustrate, media content instance 700 may include a television program (e.g., a television program titled "Larry King Live"). As shown in FIG. 7, in certain examples, poll 702 may be displayed concurrently and together with media content instance 700. Poll 702 may include a poll question 704 and one or more corresponding response choices 706 from which a user may choose a response to poll question 704.

In some examples, the topic of poll 702 may correspond with a topic of media content instance 700. To illustrate, a topic of conversation associated with media content instance 700 may be related to a recent presidential debate between presidential candidates "Allison Taylor" and "Noah Daniels." Poll 702 may be configured to elicit public opinion regarding the presidential debate. For example, poll question 704 may ask, "Which presidential candidate won the debate?," and response choices 706 may include "A. Allison Taylor," "B. Noah Daniels," and "C. Neither." In response to poll 702, a user may utilize the access device displaying poll 702 to submit a response to poll question 704. In some examples, poll 702 may be configured to allow the user to submit a response to poll question 704 using the same access device (e.g., a mobile phone device, a set-top-box device, a personal computer) through which poll 702 is received. To illustrate, a user may utilize a remote control device associated with a set-top-box device through which media content instance 700 and poll 702 are being received to enter a selection of one of response choices 706. Accordingly, a poll provider may leverage media content instance 700 to receive responses to poll 702.

In some examples, the transmission of data representative of poll 702 to a plurality of users may be user activated. For example, a user may be viewing media content instance 700 and may wish to provide user feedback regarding media content instance 700 or to participate in any available user polls associated with media content instance 700. Accordingly, the user may utilize an access device to activate poll 702 or any other available polls associated with media content instance 700. For example, a user may utilize an input device (e.g., a remote control device) associated with a set-top-box device to activate and participate in one or more available polls. As a result, transmission of data representative of the poll may be in response to a request by the user.

Media content instance 700 and poll 702 are illustrated in FIG. 7 for exemplary purposes only. In additional or alternative examples, a poll may be transmitted in conjunction with any type of media content instance in any suitable manner, and the poll may be configured to elicit any type of information as may serve a particular implementation.

Additionally or alternatively, poll distribution facility 304 may be configured to transmit a poll received from a poll provider to a select number of users. For example, poll distribution facility 304 may be configured to transmit the poll for distribution to only users that satisfy one or more distribution criteria as specified by the poll provider, and as explained in more detail herein. Poll distribution facility 304 may abstain from transmitting the poll to any user that does not satisfy the one or more distribution criteria. Distribution criteria may include any suitable criteria, as may be specified by a poll provider and/or as may serve a particular implementation.

Returning to FIG. 4, in step 406, data representative of one or more responses to the at least one poll question may be received. For example, aggregation facility 306 may receive data representative of the one or more responses from one or more access devices (e.g., access subsystems 106) associated with one or more users (e.g., users 108). The data representative of the one or more responses may be received by aggregation facility 306 in any suitable manner.

In step 408, data representative of the one or more responses may be aggregated across the plurality of distinct, heterogeneous media platforms. The data representative of the one or more responses may be aggregated by aggregation facility 306 in any suitable manner.

Figure 8:
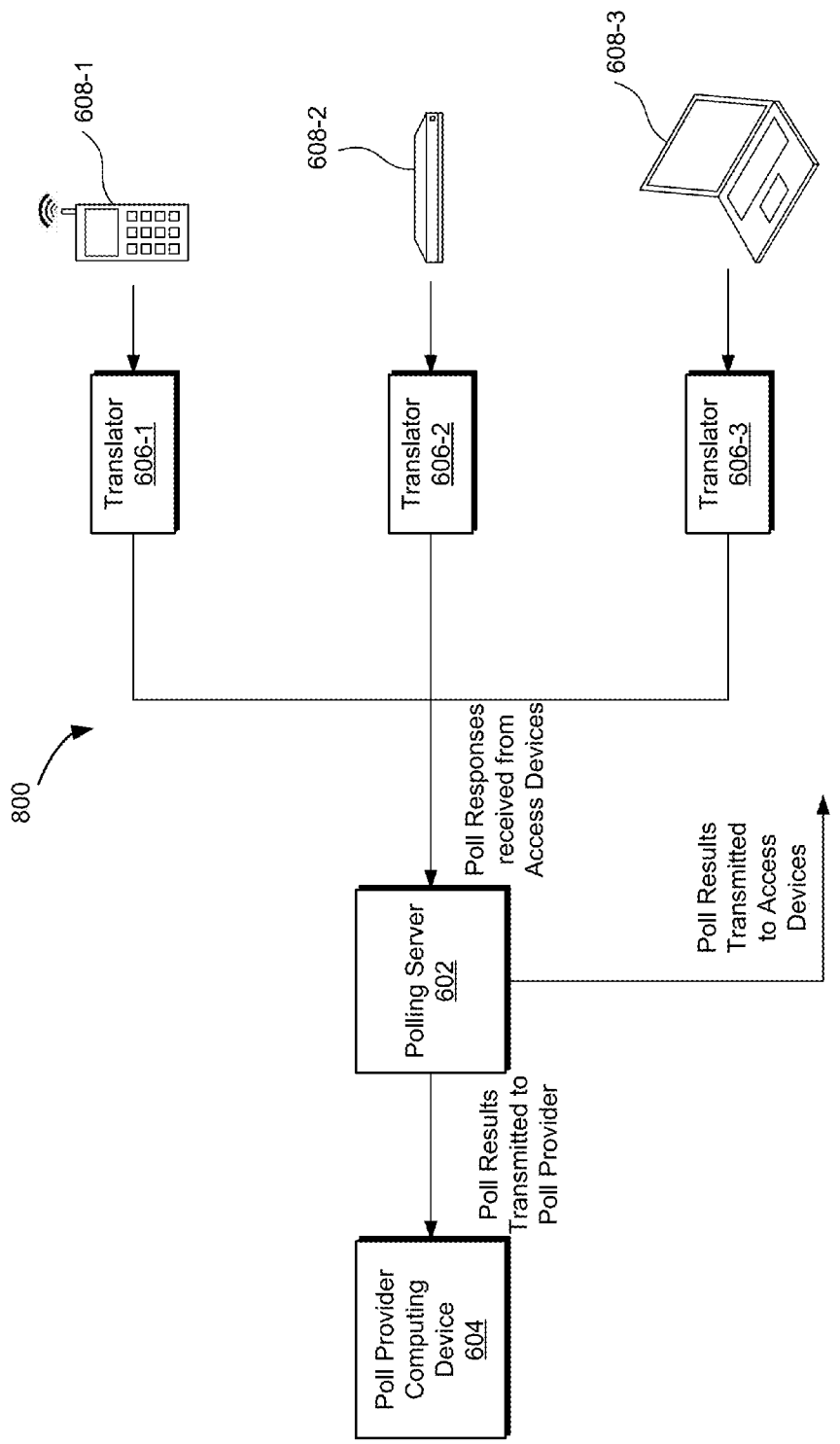
FIG. 8 illustrates the flow of one or more poll responses from a plurality of access devices to a polling server and a flow of poll results from the polling server to a poll provider and to the plurality of access devices according to principles described herein.

To further illustrate steps 406 and 408, FIG. 8 shows an exemplary implementation 800 in which one or more poll responses are received by polling server 602 from access devices 608. In certain examples, users associated with access devices 608 may utilize the access devices 608 to submit one or more responses to one or more poll questions transmitted by polling server 602. As mentioned above, each of the access devices 608 and translators 606 may be associated with a different media platform. In some examples, translators 606 may be configured to translate the one or more responses from data formats native to access devices 608 to a data format used by polling server 602. After the poll responses have been received by polling server 602, polling server 602 may aggregate the one or more responses in preparation for generating poll results to be transmitted to poll provider computing device 604 and/or access devices 608. In some examples, the receiving and aggregation of the poll responses may be performed by polling server 602 in real time. As a result, a poll provider associated with poll provider computing device 604 may leverage polling server 602 to obtain timely poll responses from a plurality of users associated with a plurality of access devices 608 across a plurality of distinct, heterogeneous media platforms.

Returning to FIG. 4, in step 410, poll results may be generated based on the aggregated data representative of the one or more responses. Poll results generation facility 308 may be configured to generate the poll results based on one or more of the aggregated responses in any suitable manner as may serve a particular implementation.

Figure 9:
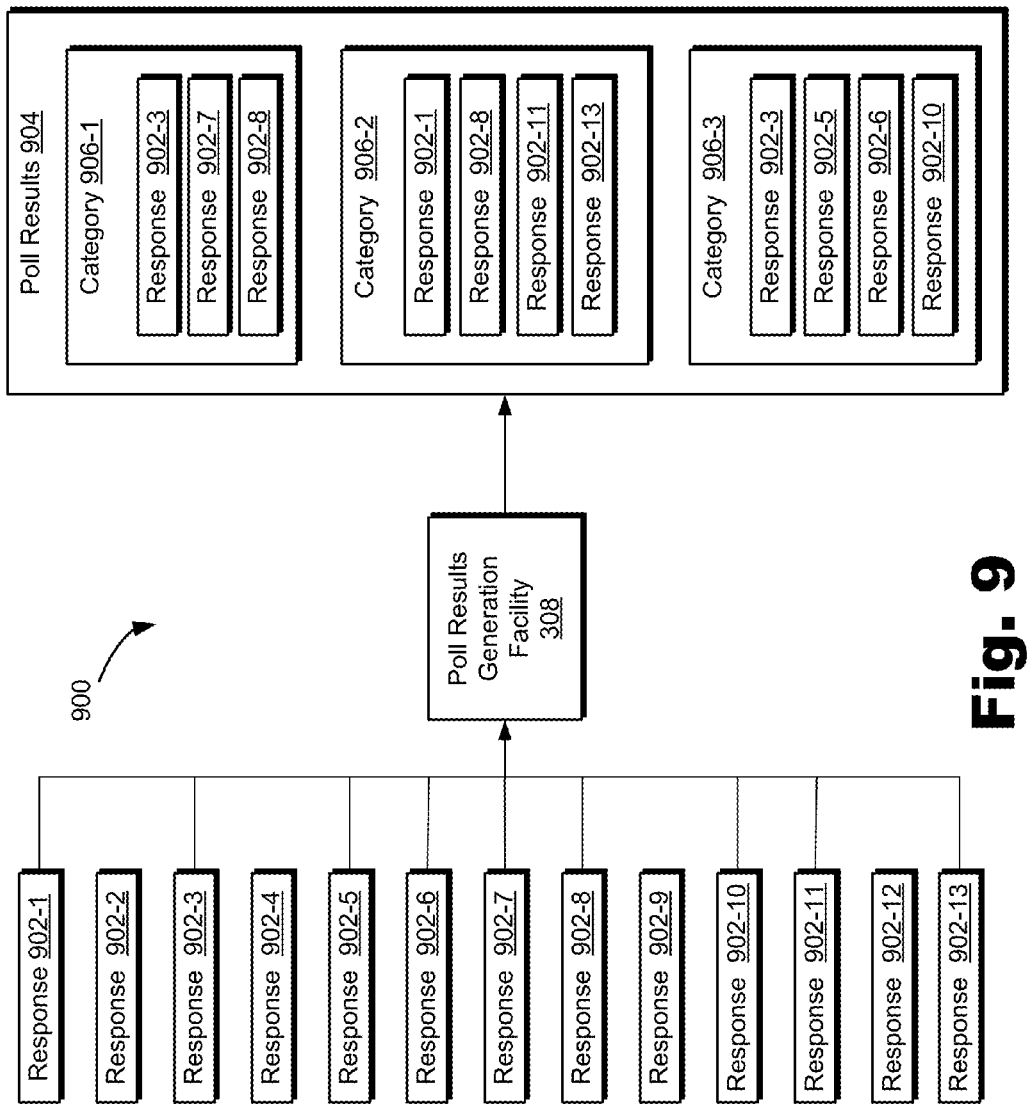
FIG. 9 illustrates an exemplary generation of poll results based on aggregated poll responses according to principles described herein.

To illustrate, FIG. 9 shows an implementation 900 of system 100 in which poll results generation facility 308 receives poll responses 902-1 through 902-13 (collectively referred to herein as "responses 902") and generates poll results 904 according to principles described herein. Responses 902 may be received, for example, from aggregation facility 306 after responses 902 have been submitted by users and aggregated by aggregation facility 306. Poll results generation facility 308 may be configured to perform any suitable calculation to generate poll results 904 based on responses 902. For example, poll results generation facility 308 may be configured to calculate the cumulative number of responses to a poll question, the number of responses corresponding to each possible response choice to the poll question, the percentages of responses corresponding to each possible response choice to a poll question, and/or any other suitable calculation as may serve a particular implementation.

Additionally or alternatively, poll results generation facility 308 may be configured to categorize the poll results. For example, poll results generation facility 308 may be configured to categorize responses 902 into a plurality of categories 906-1, 906-2, and 906-3 (collectively referred to herein as "categories 906"). In some examples, categories 906 may be based on information associated with the plurality of users that submitted responses 902. To illustrate, category 906-1 may represent responses received from users having a first political affiliation (e.g., an affiliation with the Republican party), category 906-2 may represent responses received from users having a second political affiliation (e.g., an affiliation with the Democratic party), and category 906-3 may represent responses received from users having a third political affiliation (e.g., independent of any political party). Alternatively, categories 906 may be based on the media platforms through which the plurality of users submitted their responses. For example, category 906-1 may represent responses received through a first media platform (e.g., a mobile phone service platform), category 906-2 may represent responses received through a second media platform (e.g., a television service platform), and category 906-3 may represent responses received through a third media platform (e.g., an Internet service platform).

Each of the responses 902 may be included in any number of categories. For example, poll results generation facility 308 may be configured to categorize responses 902 multiple times as may be desirable for a particular application. In some examples, a poll provider may want to have the poll results 904 categorized by age, geographic location, ethnicity, political affiliation, race, socio-economic status, social network affiliation, media platform, education, and/or any other suitable basis. The preceding categories are provided for illustrative purposes only. In further examples, poll results generation facility 308 may categorize poll results 904 into any number of overlapping and/or exclusive categories based on any available information as may serve a particular implementation.

Returning to FIG. 4, in step 412, data representative of generated poll results may be transmitted to the poll provider subsystem. For example, poll distribution facility 310 may be configured to transmit poll results generated by poll results generation facility 308 to poll provider subsystem 104 in any suitable manner.

FIG. 10 illustrates an exemplary GUI 1000 displaying data representative of poll results. As shown in FIG. 10, poll results related to a poll 1002 may be displayed in GUI 1000 for viewing by a poll provider. GUI 1000 may include a display of any information relevant to poll 1002, such as the poll title, the poll question(s), and response choices corresponding to the poll question(s). GUI 1000 may also include a display of poll results 1004 generated based on responses received from users. As shown in FIG. 10, poll results 1004 may include total poll results and categorized poll results based on one or more categories. To illustrate, poll results 1004 are categorized based on the media platforms through which the responses were received and based on the political affiliations of the users that submitted the responses. As illustrated, the poll results 1004 may include tallies of responses corresponding to each possible response choice and percentages of responses corresponding to each possible response choice. Additionally or alternatively, GUI 1000 may be updated with real time updates as additional responses are received. Accordingly, a poll provider may utilize GUI 1000 to efficiently track information regarding one or more polls being conducted.

GUI 1000 is provided for illustrative purposes only. Data representative of the generated poll results may be transmitted to poll provider subsystem and/or presented to a poll provider in any other suitable manner.

Figure 11:
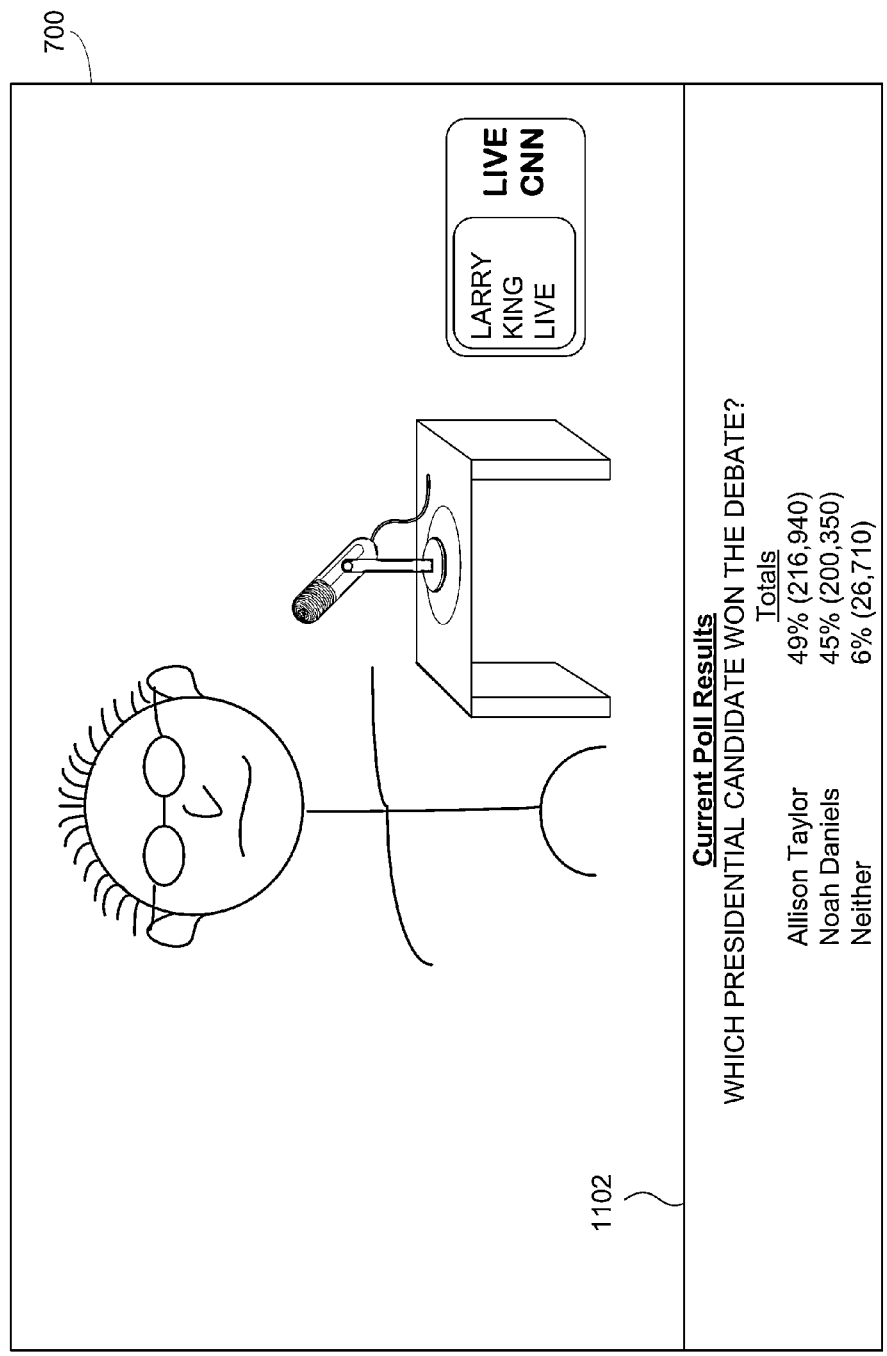
FIG. 11 illustrates an exemplary display of poll results in conjunction with the display of a media content instance according to principles described herein.
Figure 12:
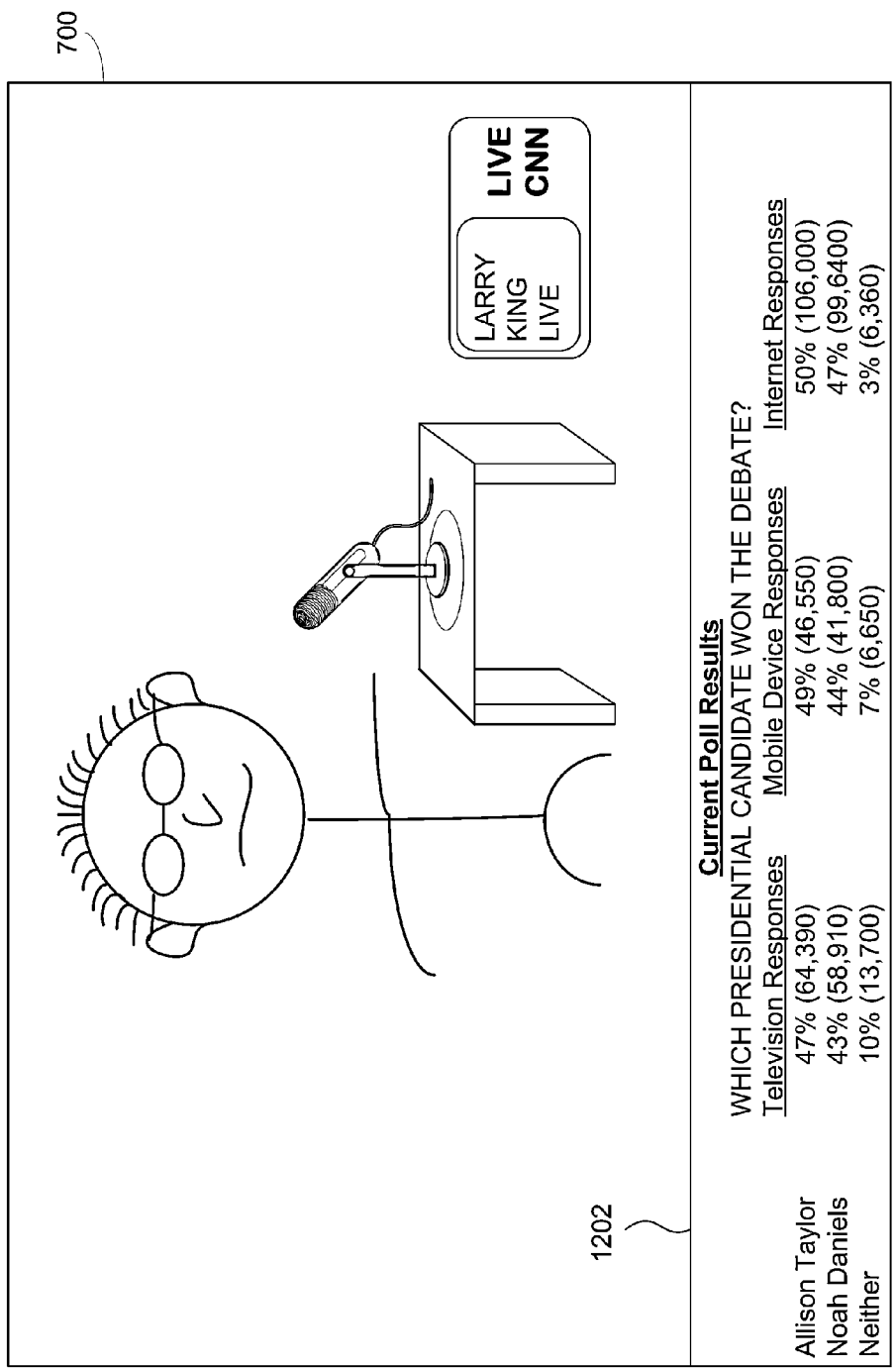
FIG. 12 illustrates an exemplary display of poll results categorized based on media platforms in conjunction with the display of a media content instance according to principles described herein.
Figure 13:
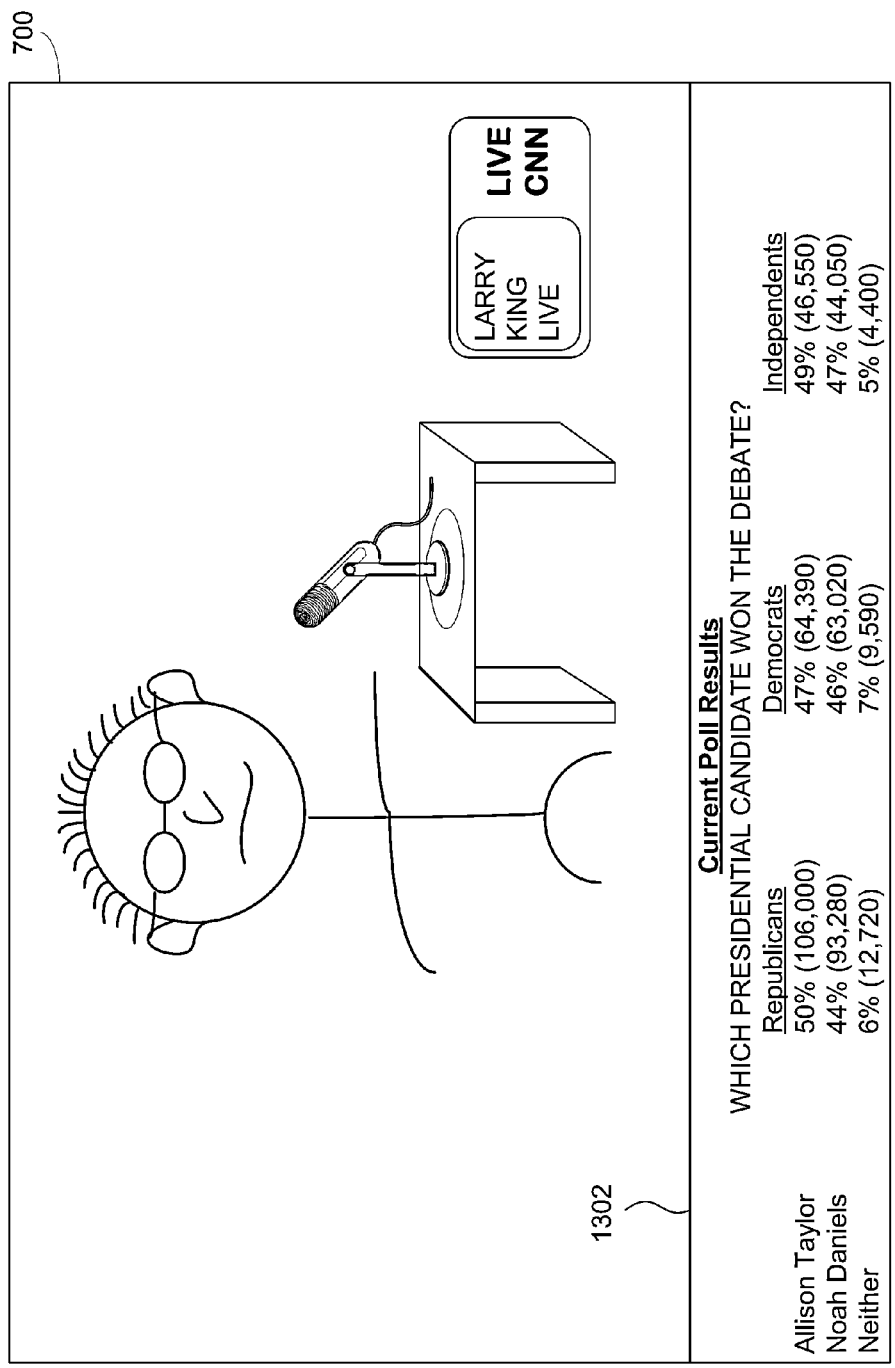
FIG. 13 illustrates an exemplary display of poll results categorized based on political affiliation in conjunction with the display of a media content instance according to principles described herein.

In addition or alternative to being transmitted to the poll provider subsystem, the generated poll results may be transmitted to one or more access devices associated with one or more users (e.g., users that have submitted poll responses and/or users that have yet to submit poll responses) in step 412 of FIG. 4. To illustrate, FIGS. 11 through 13 show poll results 1102, 1202, and 1302 being displayed in conjunction with the display of media content instance 700 according to principles described herein. As shown in FIGS. 11 through 13, poll results 1102, 1202, and 1302 may be displayed in the same display screen as media content instance 700 and in the same manner as poll 702 is displayed (see FIG. 7). Poll results 1102, 1202, and 1302 may include cumulative as well as categorized poll results, as explained in more detail herein. For example, FIG. 11 shows poll results 1102 representing cumulative or total poll results, FIG. 12 shows poll results 1202 representing poll results categorized based on the media platforms through which the responses were received, and FIG. 13 shows poll results 1302 representing poll results categorized by the political affiliation of the users that submitted the responses.

FIGS. 11 through 13 are provided for illustrative purposes only. In additional or alternative examples, data representative of poll results may include any suitable information and may be transmitted to access devices associated with the users in any other suitable manner (e.g., by way of text message or by way of email). As a result, the users may benefit from the information garnered by the user poll.

Figure 14:
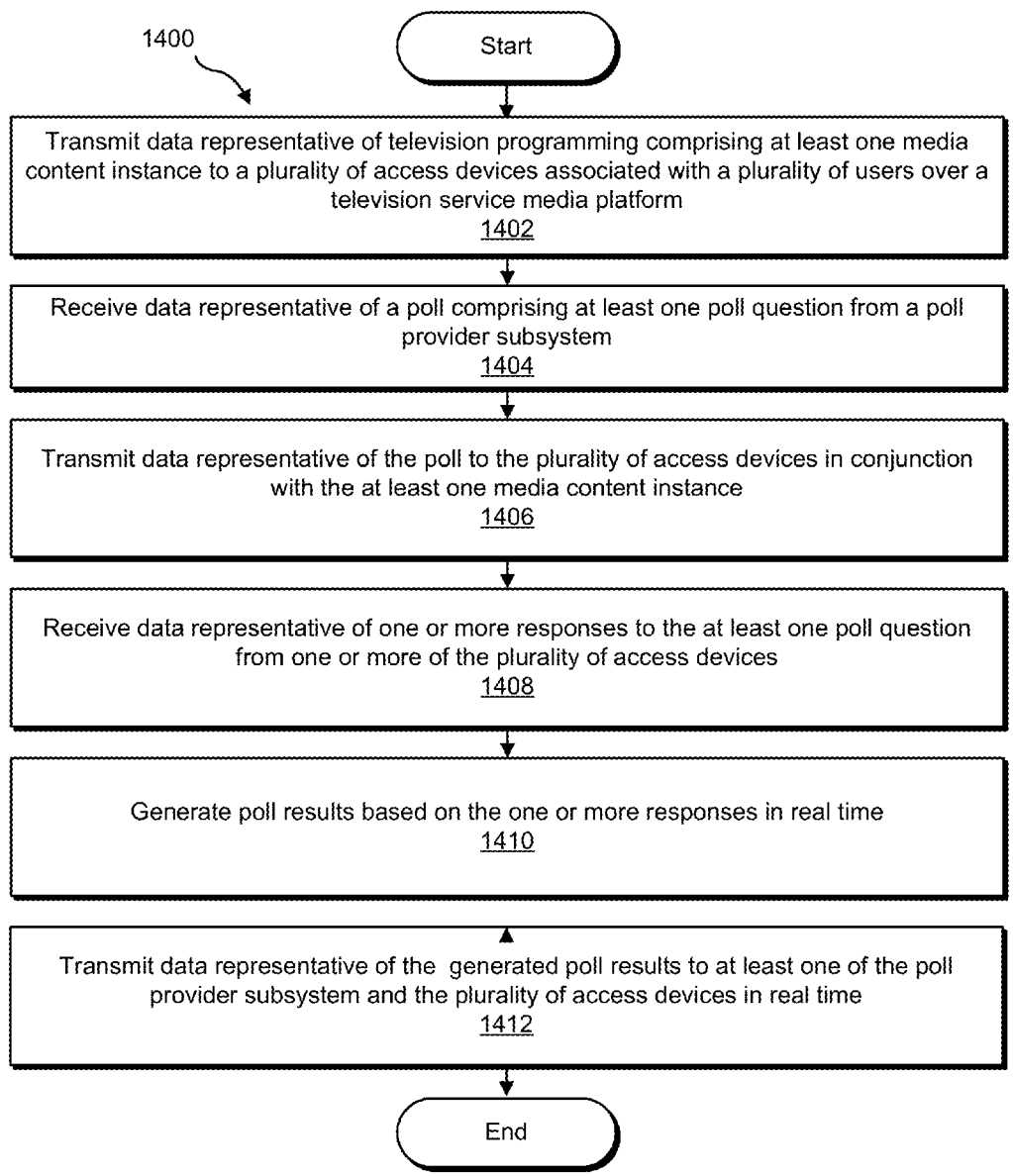
FIG. 14 illustrates another exemplary user polling method according to principles described herein.

FIG. 14 illustrates another exemplary user polling method 1400. While FIG. 14 illustrates exemplary steps according to one embodiment, other embodiments may omit, add to, reorder, and/or modify any of the steps shown in FIG. 14. One or more steps shown in FIG. 14 may be performed by any component or combination of components of system 100.

In step 1402, data representative of television programming comprising at least one media content instance may be transmitted to a plurality of access devices associated with a plurality of users over a television service media platform. The data representative of the television programming may be transmitted in any suitable manner (e.g., by broadcast or multicast transmission).

In step 1404, data representative of a poll comprising at least one poll question may be received from a poll provider subsystem. The poll may specify one or more response choices corresponding to the at least one poll question. In some examples, the poll may be configured to elicit user opinion regarding the at least one media content instance and/or a topic or event associated with the at least one media content instance. The data representative of the poll may be received in any of the ways described herein.

In step 1406, data representative of the poll may be transmitted to the plurality of access devices in conjunction the at least one media content instance (e.g., together with and/or concurrently with the at least one media content instance). The data representative of the poll may be transmitted in any suitable manner, such as is described herein.

In step 1408, data representative of one or more responses to the at least one poll question may be received from one or more of the plurality of access devices. The one or more responses may be submitted by one or more users associated with the one or more of the plurality of access devices. The data representative of the one or more responses may be received in any suitable manner.

In step 1410, poll results based on the one or more responses may be generated in real time. The poll results may include any of the information described herein and may be generated in any of the ways described herein.

In step 1412, data representative of the generated poll results may be transmitted to at least one of the poll provider subsystem and the plurality of access devices in real time. The data representative of the generated poll results may be transmitted to at least one of the poll provider subsystem and the plurality of access devices in any of suitable manner, such as in any of the ways described herein.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied in a non-transitory computer-readable medium, or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 15:
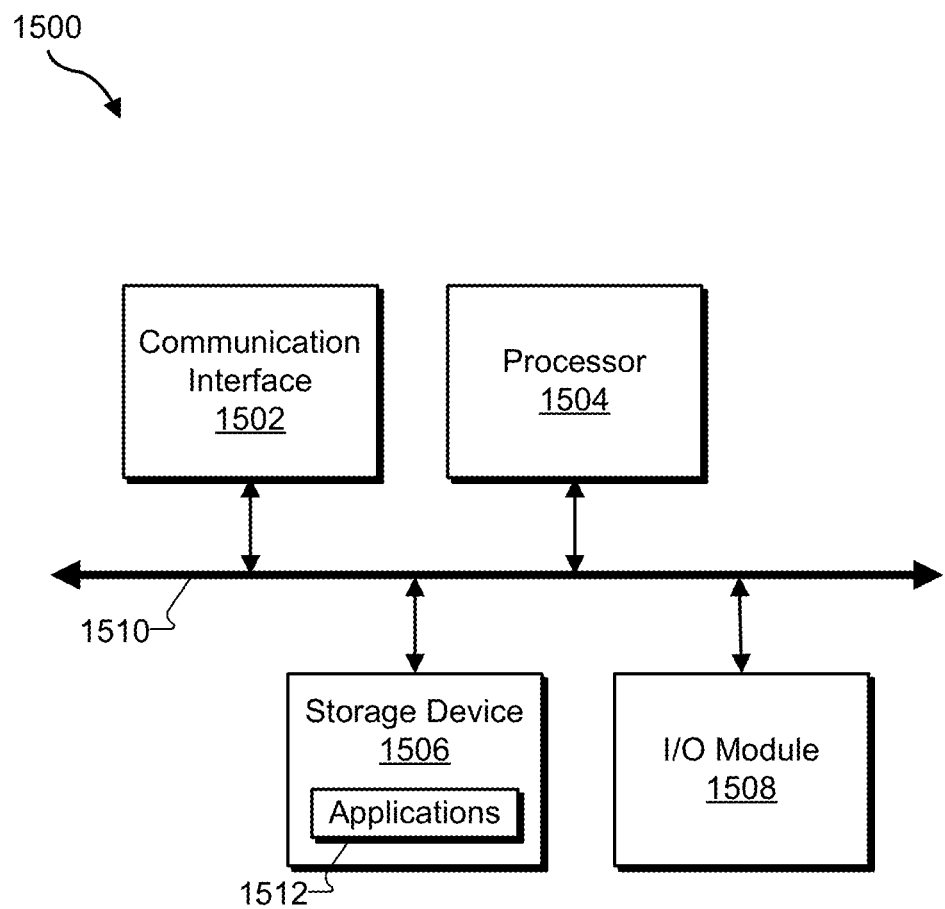
FIG. 15 illustrates an exemplary computing device according to principles described herein.

FIG. 15 illustrates an exemplary computing device 1500 that may be configured to perform one or more of the processes described herein. As shown in FIG. 15, computing device 1500 may include a communication interface 1502, a processor 1504, a storage device 1506, and an input/output ("I/O") module 1508 communicatively connected via a communication infrastructure 1510. While an exemplary computing device 1500 is shown in FIG. 15, the components illustrated in FIG. 15 are not intended to be limiting. Additional or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, and any other suitable interface. In at least one embodiment, communication interface 1502 may provide a direct connection between service provider subsystem 102, poll provider subsystem 104, access subsystems 106, and/or translators 212 via a direct link to a network, such as network 110 of FIG. 1. Communication interface 1502 may additionally or alternatively provide such a connection through, for example, a local area network (such as an Ethernet network), a personal area network, a telephone or cable network, a satellite data connection, a dedicated URL, or any other suitable connection. Communication interface 1502 may be configured to interface with any suitable communication media, protocols, and formats, including any of those mentioned above.

Processor 1504 generally represents any type or form of processing unit capable of processing data or interpreting, executing, and/or directing execution of one or more of the instructions, processes, and/or operations described herein. Processor 1504 may direct execution of operations in accordance with one or more applications 1512 or other computer-executable instructions such as may be stored in storage device 1506 or another computer-readable medium.

Storage device 1506 may include one or more data storage media, devices, or configurations and may employ any type, form, and combination of data storage media and/or device. For example, storage device 1506 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1506. For example, data representative of one or more executable applications 1512 (which may include, but are not limited to, one or more of the software applications described herein) configured to direct processor 1504 to perform any of the operations described herein may be stored within storage device 1506. In some examples, data may be arranged in one or more databases residing within storage device 1506.

I/O module 1508 may be configured to receive user input and provide user output and may include any hardware, firmware, software, or combination thereof supportive of input and output capabilities. For example, I/O module 1508 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1508 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1508 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1500. For example, one or more applications 1512 residing within storage device 1506 may be configured to direct processor 1504 to perform one or more processes or functions associated with poll provider interface facility 302, poll distribution facility 304, aggregation facility 306, poll results generation facility 308, and/or poll results distribution facility 310. Likewise, storage facility 312 may be implemented by or within storage device 1506.

The components of service provider subsystem 102 may be implemented by computing device 1500 or a combination of computing devices, such as a media content processing device, a server device (e.g., an application server, video server, web server, etc.), video hub office equipment, a set-top box, a communications device, a mobile device (e.g., a mobile phone device), a handheld device, a personal computer, a phone device, a personal-digital assistant device, a gaming device, a digital video recording ("DVR") device (e.g., a personal video recording ("PVR") device), a television device, and/or any media content access and/or distribution device configured to perform one or more of the media platform processes and/or operations described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

receiving, by a service provider subsystem from a poll provider subsystem, data representative of a poll, the poll comprising at least one poll question regarding a media content instance;

transmitting, by the service provider subsystem, the media content instance to a plurality of access devices associated with a plurality of users for viewing by the plurality of users;

transmitting, by the service provider subsystem in conjunction with the media content instance, the data representative of the poll in a first data format to a plurality of translators for translation and distribution to the plurality of access devices associated with the plurality of users, the plurality of access devices having a plurality of distinct, heterogeneous media platforms comprising a mobile phone service platform, a television service platform, and an internet service platform, wherein the plurality of translators comprises:

a mobile phone service translator associated with the mobile phone service platform and configured to translate the data representative of the poll from the first data format to a data format native to the mobile phone service platform;

a television service translator associated with the television service platform and configured to translate the data representative of the poll from the first data format to a data format native to the television service platform; and an internet service translator associated with the internet service platform and configured to translate the data representative of the poll from the first data format to a data format native to the internet service platform;

wherein the first data format, the data format native to the mobile phone service platform, the data format native to the television service platform, and the data format native to the internet service platform are different data formats;

receiving, by the service provider subsystem from the plurality of translators, data representative of one or more responses to the at least one poll question provided by one or more of the plurality of access devices associated with one or more of the plurality of users, wherein each translator within the plurality of translators is configured to translate the data representative of the one or more responses from the other data format native to one of the plurality of distinct, heterogeneous media platforms to the first data format;

aggregating, by the service provider subsystem, the data representative of the one or more responses across the plurality of distinct, heterogeneous media platforms;

generating, by the service provider subsystem, poll results based on the aggregated data representative of the one or more responses; and transmitting, by the service provider subsystem, data representative of the poll results to at least one of the poll provider subsystem and the plurality of access devices.

2. The method of claim 1, wherein the generating of the poll results based on the aggregated data representative of the one or more responses and the transmitting of the data representative of the poll results to at least one of the poll provider subsystem and the plurality of access devices are performed in real time.

3. The method of claim 1, further comprising providing, by the service provider subsystem, a graphical user interface configured to facilitate generation of the poll by a poll provider associated with the poll provider subsystem.

4. The method of claim 1, further comprising receiving, by the service provider subsystem from the poll provider subsystem, data representative of one or more distribution criteria, and wherein each of the plurality of users satisfies the one or more distribution criteria.

5. The method of claim 1, further comprising categorizing, by the service provider subsystem, the poll results based on at least one of an age, a geographic location, an ethnicity, a political affiliation, a race, a socio-economic status, a social network affiliation, a media platform, and an education associated with the one or more of the plurality of users.

6. The method of claim 1, further comprising making, by the service provider subsystem, the poll results available to persons affiliated with the one or more of the plurality of users through one or more social networks.

7. The method of claim 1, wherein the transmitting of the data representative of the poll is performed in response to requests by the plurality of users.

8. The method of claim 1, wherein the media content instance comprises an advertisement for a particular product and wherein the poll is configured to elicit user feedback regarding at least one of the advertisement and the particular product.

9. The method of claim 1, wherein the media content instance comprises a television program and the poll is configured to elicit user feedback regarding the television program.

10. The method of claim 1, wherein the poll is configured to elicit user feedback regarding a service provided to the plurality of users by a service provider associated with the service provider subsystem.

11. The method of claim 1, embodied as computer-executable instructions on at least one non-transitory computer-readable medium.

12. A physical computing system comprising:

at least one processor;

a poll provider interface facility configured to receive, from a poll provider subsystem, data representative of a poll in a first data format, the poll comprising at least one poll question regarding a media content instance;

a poll distribution facility communicatively coupled to the poll provider interface facility and configured to transmit, in conjunction with a transmission of the media content instance to a plurality of access devices associated with a plurality of users for viewing by the plurality of users, the data representative of the poll in the first data format for distribution to the plurality of access devices associated with the plurality of users, the plurality of access devices having a plurality of distinct, heterogeneous media platforms comprising:
- a mobile phone service platform and a mobile phone service translator configured to translate the data representative of the poll from the first data format to a data format native to the mobile phone service platform;
- a television service platform and a television service translator configured to translate the data representative of the poll from the first data format to a data format native to the television service platform;
- an internet service platform and an internet service translator configured to translate the data representative of the poll from the first data format to a data format native to the internet service platform;
- wherein the first data format, the data format native to the mobile phone service platform, the data format native to the television service platform, and the data format native to the internet service platform are different data formats;

an aggregation facility communicatively coupled to the poll distribution facility and configured to receive and aggregate data representative of one or more responses to the at least one poll question across the plurality of distinct, heterogeneous media platforms;

a poll results generation facility communicatively coupled to the aggregation facility and configured to generate poll results based on the one or more responses; and a poll results distribution facility communicatively coupled to the poll results generation facility and configured to transmit data representative of the poll results to the poll provider subsystem.

13. The physical computing system of claim 12, wherein the poll results distribution facility is further configured to transmit data representative of the poll results to one or more of the plurality of access devices.

14. The physical computing system of claim 13, wherein the poll results generation facility is further configured to generate poll results in real time and wherein the poll results distribution facility is further configured to transmit data representative of the poll results to at least one of the poll provider subsystem and the one or more of the plurality of access devices in real time.

15. The physical computing system of claim 12, wherein:
- the media content instance comprises a television program; and
- the poll distribution facility is further configured to transmit the data representative of the poll to one or more of the plurality of access devices over the television service platform for display by the one or more of the plurality of access devices in conjunction with the television program.

16. The physical computing system of claim 15, wherein the poll is configured to elicit user feedback regarding the television program.

* * * * *